Figure 1:
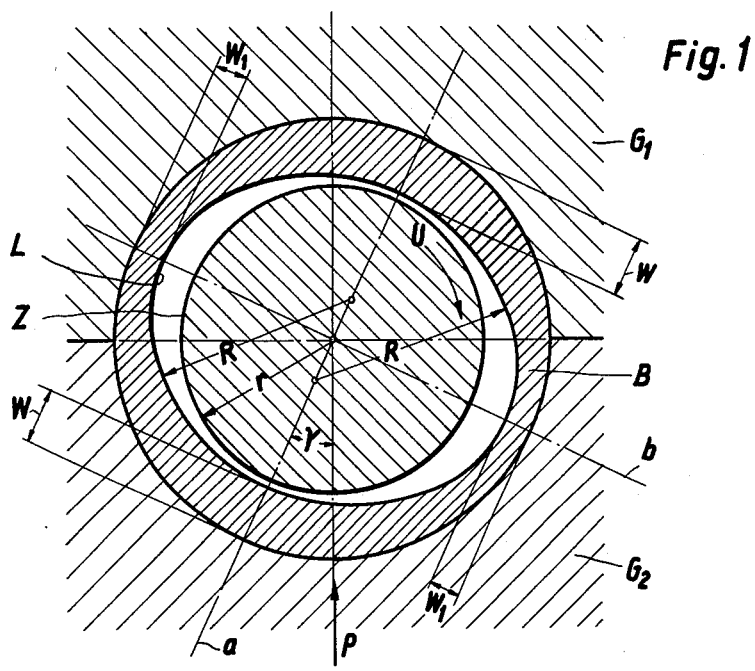

Inventor:
ALFRED BUSKE ical form; and FIG. 2 represents a sliding bearing the body of which is made up of two bearing halves having circular inner and outer arcs.

In the drawing, like reference characters refer to corresponding parts.

The sliding bearing of FIG. 1 consists of two housing parts G–1 and G–2 with a cylindrical bore for receiving the one piece bearing body B. The latter has a friction surface L of approximately elliptical shape, and which is so disposed in the bearing that its axis $a$ is divergent from the direction of the bearing load P on the shaft and through the center thereof. Accordingly, axis $b$ of the ellipse is divergent by the same angle from the horizontal line of the bearing. Axis $a$ of the ellipse intersects bearing body B at its thickest points W. From these points the thickness of the bearing body decreases continuously in both peripheral directions as far as the points of intersection with the axis $b$ of the ellipse. At these points the thickness of the bearing body B has the value $W_1$. U indicates the direction of rotation of the journal Z whose radius is designated as $r$. R indicates the radii of the bearing areas of friction surface L. The centers M of the circles with the radius R are located opposite one another on axis $a$ of the ellipse, at equal distances from the center of the bearing.

Figure 2:
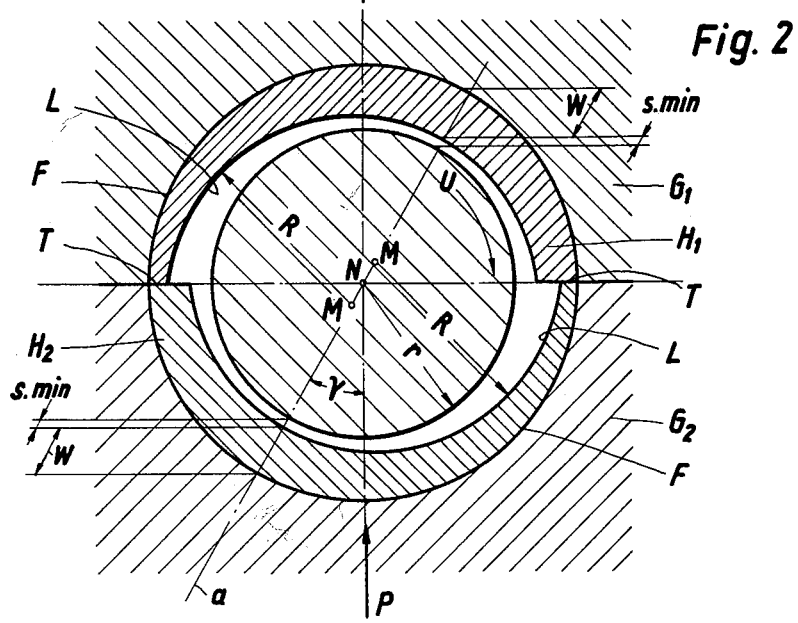

In the embodiment shown in FIG. 2 the sliding bearing comprises two bearing halves and the bearing surfaces of each half is a circular arc in form and is less than a semicircle in arcuate length. The bearing halves are laid up with arc end peripheral portions thereof in abutting relation and with adjacent arc ends offset. In this manner, a bearing bore is provided which operates in the manner of an oval bearing shown in FIG. 2, there are two housing parts G–1 and G–2 with cylindrical bore F to receive two bearing shells H–1 and H–2. The center N of bore F coincides with the parting line of the housing. The horizontal division T of the housing halves G–1 and G–2 coincides with that of the bearing shells H–1 and H–2.

The difference between the embodiment in FIG. 2 and the one in FIG. 1 consists only in the horizontal division of the bearing, creating two shells H–1 and H–2 whose inner edges, though parallel to the longitudinal axis of the bearing, are offset from one another horizontally, the friction surfaces L having the uniform radii R. In this embodiment, too, the two diametrically opposite restrictions $S_{min}$ are offset in direction U away from the principal load plane P by the angle $\gamma$.

In the bearings made according to the invention, the position of the narrowest bearing clearance $S_{min}$ will be a position within the range specified, wherein the line connecting the restrictions in the journal clearance is tilted about the center point of the journal by an angle of 8–60°, preferably 10–30°, from the line of the main loading of the bearing. Small $\gamma$ angles are to be used for low rotatory speeds and large $\gamma$ angles for high rotatory speeds for the same amount of bearing load. In the case of high bearing loads, small $\gamma$ angles are preferable.

The journal is held very closely in the bearing and consequently can perform only much smaller movements than in a journal bearing with a cylindrical bore. At the same time, the shape of the tapered lubricating gap can be varied within wide limits by selecting the radius of curvature R of the friction surface at the loci of bearing engagement in proportion to the journal radius $r$, thus achieving the most favorable conditions for the lubrication of the bearing in relation to load and speed. It has been determined by experiments with the bearings of the invention that performance is best when the ratio $$\frac{R-r}{r}$$

is from $0.8 \times 10^{-3}$, to $6 \times 10^{-3}$, and preferably from $10^{-3}$ to $2.5 \times 10^{-3}$.

Also the position of the narrowest lubrication gap that is produced in operation is largely dependent upon the position of the smallest diameter, and is substantially predetermined by the design of the invention.

The present invention can also be embodied by using a journal bearing having a cylindrical friction surface with a journal having an oval shape in cross-section.

The invention is further illustrated by the following examples.

*Example 1*

In this example, the following conditions obtain.

Bearing load $P=1600$ kp.
Journal diameter $d=50$ mm.
Bearing width $B=50$ mm.
Bearing width journal ratio $B/d=1$
Specific bearing burden $$\bar{p} = \frac{P}{d \times B} = \frac{1600}{25} = 64 \text{ kp./cm.}^2$$

Number of revolutions $n=500$ r.p.m.
Angle speed $$\omega = \frac{\pi \times n}{30} = 52.4 \text{ 1/s}$$

Viscosity of lubricating oil at operation temperature $\eta=15$ centipoise $=15.3 \times 10^{-4} \frac{\text{kp.} \times s}{\text{m.}^2}$ If for the lubricating wedge forms the ratio $$\psi = \frac{R-r}{r} = 1.5 \times 10^{-3}$$

then at the comparatively low r.p.m. of 500, an angle $\gamma$ of 15–20 degree is recommended. The angle can be roughly determined from the above figures and the Sommerfeld number So applying for the journal bearing. Sommerfeld number $$So = \frac{p \times \psi^2}{\eta w} = \frac{64 \times 2.25}{15.3 \times 52.4} \times 100 = 18$$

From this it follows according to Sassenfeld and Walter, Gleitlagerberechnungen, VDI Forschungshelf No. 441, page 17, tables of FIGS. 5 and 9 and also according to Vogelpohl, Betriebssichere Gleitlager, Springer Verlag, 1958, page 67, tables of FIG. 3.2, and page 1, FIG. 3.5, for a bearing with the width-ratio $B/d=1$, the location of the journal center in the bearing bore as relative eccentricity is $$\chi = \frac{e}{R-r} = 0.95$$

and the location of the narrowest lubricating slit is at the angle $\gamma=17°$.

*Example 2*

If the conditions in Example 1 are modified to make the lubricating wedge more pointed, for instance, with the ratio $$\psi = \frac{R-r}{r} 1 \times 10^{-3}$$

then the Sommerfeld number is $So=8$ and at the width ratio $B/d=1$, the relative eccentricity is $\chi=0.9$, with the position of the narrow point in the bearing at the angle of about $\gamma=25$ angle degree.

*Example 3*

In this example the following conditions obtain:
Bearing load $P=500$ kp.
Number of revolutions $n=6000$ r.p.m., $\omega=628$ 1/s
Viscosity of the lubricating oil at operation temperature $\eta=10$ centipose $=10.2 \times 10^{-4}$ kp.$\times$s./m.$^2$
Journal $d=80$ mm.
Bearing width $B=40$ mm.
Bearing width journal ratio $B/d=0.5$
Specific bearing burden $$\bar{p} = \frac{P}{d \cdot B} = \frac{500}{8.4} = 15.6 \text{ kp./cm.}^2$$

Here the lubricating wedge form $\psi$ is $$\psi = \frac{R-r}{r} = 2.5 \times 10^{-3}$$

The Sommerfeld number is $$So = \frac{15.6 \times 6.25}{10.2 \times 6.28} \times 100 = 1.59$$

For the bearing width ratio $B/d=0.5$ the relative eccentricity $\chi=0.78$, and the angle $\gamma$ for the narrow point in the bearing is $\gamma=32°$.

*Example 4*

If in Example 3 the lubricating wedge form is changed to $$\psi = \frac{R-r}{r} = 1.5 \times 10^{-3}$$

so that the wedge is more pointed, then the Sommerfeld number $So=0.57$ and with the width ratio $B/d=0.5$ the relative eccentricity is 0.63 and the angle for the narrow point in the bearing is about $\gamma=43°$.

While the invention has been described with respect to particular embodiments thereof, various changes and modifications will occur to those skilled in the art, and it is desired to secure by these letters patent all such modifications as are within the scope of the appended claims.

What is claimed is:

1. An assembly comprising a shaft and a sliding bearing therefor and in slide bearing engagement therewith, the bearing being in said bearing engagement at two diametrically opposed spaced loci about the shaft circumference, a line through said spaced diametrically opposed loci being offset from a line in the direction of the center of load on the shaft by an angle of about 8–60°, the offset being in the direction of rotation of the shaft.

2. An assembly according to claim 1, the said angle being about 10–30°.

3. A slide bearing comprising two bearing halves each being a recess with a slide bearing surface extending therethrough, said surfaces being circular arcs in form and less than semicircles in arcuate length, said bearing halves being laid up with arc end peripheral portions thereof in abutting relation and adjacent arc ends offset to provide a bearing bore for receiving a circular shaft in bearing engagement at two diametrically spaced loci about the shaft circumference, a line through said spaced diametrically opposed loci being inclined to a line through the planes of abutment of the bearing halves.

4. A slide bearing according to claim 3, the outer surface of each bearing half being a semicircular arc in form, said semicular arcs meeting to define a circular form.

5. A bearing assembly according to claim 4, and comprising a housing for said bearing.

References Cited in the file of this patent

UNITED STATES PATENTS

| | | |
|---|---|---|
| 2,901,297 | Sternlicht | Aug. 25, 1959 |
| 3,070,406 | McKenney | Dec. 25, 1962 |